United States Patent
Ashino

(10) Patent No.: US 9,733,140 B2
(45) Date of Patent: Aug. 15, 2017

(54) DOUBLE DIAPHRAGM TYPE PRESSURE SENSOR

(71) Applicant: FUJI ELECTRIC CO., LTD., Kawasaki-shi, Kanagawa (JP)

(72) Inventor: Kimihiro Ashino, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 94 days.

(21) Appl. No.: 14/708,888

(22) Filed: May 11, 2015

(65) Prior Publication Data
US 2015/0369680 A1    Dec. 24, 2015

(30) Foreign Application Priority Data
Jun. 19, 2014    (JP) .................................. 2014-126191

(51) Int. Cl.
G01L 9/00      (2006.01)
G01L 19/00     (2006.01)
G01L 19/06     (2006.01)

(52) U.S. Cl.
CPC .......... *G01L 9/0054* (2013.01); *G01L 9/0055* (2013.01); *G01L 19/0084* (2013.01); *G01L 19/0645* (2013.01)

(58) Field of Classification Search
None
See application file for complete search history.

(56) References Cited

U.S. PATENT DOCUMENTS

| 5,335,549 A * | 8/1994 | Kato ..................... G01L 9/0052 73/706 |
| 2003/0213307 A1* | 11/2003 | Kaneko ............... G01L 19/0061 73/720 |
| 2007/0014689 A1* | 1/2007 | Teugels ............... A61M 1/3639 73/706 |

FOREIGN PATENT DOCUMENTS

| JP | S57-112228 U | 7/1982 |
| JP | H01-142833 U | 9/1989 |
| JP | H03-115831 U | 12/1991 |
| JP | EP 0545319 A2 * | 6/1993 ........... G01L 9/0052 |
| JP | H05-149814 A | 6/1993 |
| JP | H06-094558 A | 4/1994 |
| JP | 2003-287472 A | 10/2003 |
| JP | 2009-186209 A | 8/2009 |

OTHER PUBLICATIONS

Japan Patent Office, "Office Action for Japanese Patent Application No. 2014-126191," dated May 16, 2017.

\* cited by examiner

*Primary Examiner* — Andre Allen
(74) *Attorney, Agent, or Firm* — Manabu Kanesaka

(57) ABSTRACT

A double diaphragm type pressure sensor includes a metal container having a concave portion; a pressure sensor unit mounted on a bottom of the container; a metal diaphragm airtightly bonded to an opening portion of the concave portion of the container; a pressure transmission medium filling a space formed by the metal diaphragm and the concave portion of the container; and a metal terminal penetrating the bottom of the container and being electrically insulated from the container.

9 Claims, 6 Drawing Sheets

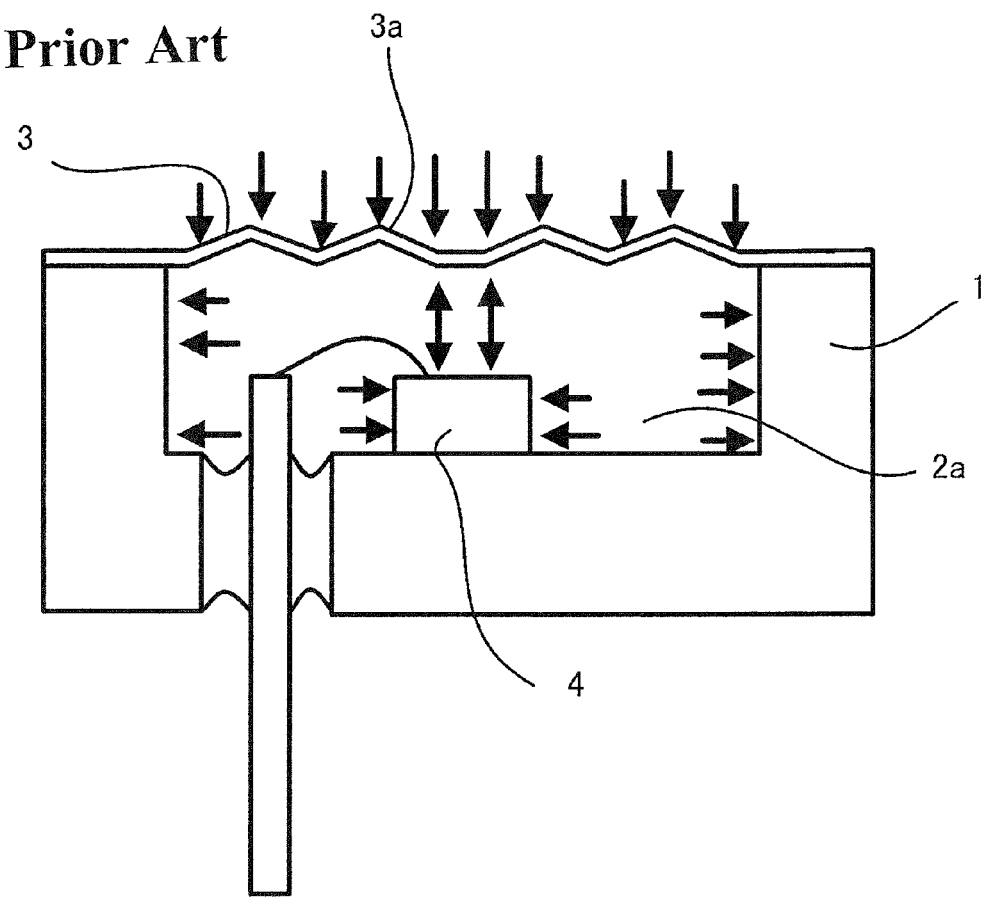

DOUBLE DIAPHRAGM TYPE PRESSURE SENSOR

CROSS-REFERENCE TO RELATED APPLICATION

The present application is a US application claiming priority from Japanese Application No. 2014-126191 filed Jun. 19, 2014, the disclosure of which is incorporated herein.

BACKGROUND OF THE INVENTION

Field of the Invention

The present invention relates to a liquid seal type pressure sensor having a double diaphragm.

Description of the Background Art

A liquid pressure detecting pressure sensor is used for a consumer electrical appliance, an automobile air-conditioner etc. A pressure sensor (liquid seal type pressure sensor 10) in which a pressure transmission medium 2 (liquid) is tightly sealed inside a container 1 as shown in FIGS. 5A and 5B has been known as such a pressure sensor. FIG. 5A is a plan view of a diaphragm of the pressure sensor viewed from above. FIG. 5B is an explanatory sectional view taken along line 5A-5A in FIG. 5A. The liquid seal type pressure sensor 10 is typically used for higher pressure detection in comparison with a gas pressure detecting pressure sensor. The container 1 is formed to have a space in which the pressure transmission medium 2 (liquid) is tightly sealed between the metal diaphragm 3 and the pressure sensor unit 4. A concentric circular corrugated shape 3a is formed in the metal diaphragm 3 of the pressure sensor. Liquid such as oil 2a whose volume hardly changes due to pressure is preferably used as the pressure transmission medium 2 (liquid). As indicated by arrows in FIG. 6, a liquid pressure of an external liquid to be measured/detected is transmitted to the pressure sensor unit 4 through the metal diaphragm 3 having the corrugated shape 3a and the oil 2a tightly sealed in the sealed space. Thus, the liquid pressure of the external liquid can be detected. The liquid seal type pressure sensor 10 shown in FIGS. 5A and 5B and FIG. 6 includes a double diaphragm comprising the metal diaphragm 3 and a semiconductor silicon diaphragm (not shown in drawing) built in the pressure sensor unit 4. Accordingly, the liquid seal type pressure sensor 10 has an advantage that the pressure sensor unit 4 can be completely protected from the external liquid because the pressure sensor unit 4 is not directly contacting the external liquid.

A stainless steel material is mainly used as the material of the metal diaphragm 3 used in the liquid seal type pressure sensor 10. A stainless steel material processed to be 15 µm to 40 µm thick can be used. Other than stainless steel, non-ferrous metal such as phosphor bronze may be used. For example, silicone oil is preferably used as the pressure transmission medium 2 (oil 2a) for transmitting the pressure of the external liquid received by the metal diaphragm 3 to the pressure sensor unit 4 inside the container 1. The oil 2a is tightly sealed in the space between the metal diaphragm 3 and the pressure sensor unit 4. The oil 2a has a function to properly transmit the pressure of the external liquid received by the metal diaphragm 3 to the pressure sensor unit 4 when the oil 2a is at a constant temperature. However, the tightly sealed oil 2a changes in volume when the temperature changes. That is, when the oil 2a is heated, it expands from an original position indicated by a broken line as shown in FIG. 4. When the oil 2a is cooled, it contracts. The volume change caused by the temperature change functions as a pressure on an inner wall of the container 1 forming the tightly sealed space and also acts as a pressure on the pressure sensor unit 4 mounted in the same space, as indicated by arrows in FIG. 4. Accordingly, the volume change caused by the temperature change adversely affects temperature characteristics of the pressure sensor unit 4 conspicuously. The concentric circular corrugated shape 3a is formed in the metal diaphragm 3 of the pressure sensor. The object is to change the shape, size, etc. of the concentric circular corrugated shape 3a so as to reduce the spring modulus (rigidity) of the metal diaphragm 3 and increase the substantial area of the metal diaphragm in the same pressure receiving area to thereby suppress the increase of the internal pressure.

As to the liquid seal type pressure sensor having such a structure, a literature regarding an invention of a magnetoresistance transducer describes a temperature compensating diaphragm having a structure in which a plurality of diaphragms having different thermal expansion coefficients is laminated to one another to make temperature compensation based on a difference among the thermal expansion coefficients of the plurality of diaphragms (JP-UM-A-3-115831 (in Lines 10 to 13 in Claim (4) for Utility Model registration)).

In order to reduce deformation of the diaphragm caused by the temperature change, it has been described that stainless steels having different thermal expansion coefficients are used separately for an inner layer and an outer layer (JP-A-2009-186209 (Problem and Solution in Abstract)).

However, when the pressure receiving area of the metal diaphragm is reduced in response to a request for the miniaturization of a product etc., the spring constant for the same plate thickness or corrugated shape of the diaphragm as that in the conventional art is increased and the internal pressure is also increased greatly. Therefore, in order to further reduce the rigidity of the metal diaphragm, for example, reducing the plate thickness is anticipated. However, when the plate thickness is further reduced, secondary factors such as the processing limit of the corrugated shape, deformation caused by deterioration of the strength of the material, and difficulty of handling may newly occur.

SUMMARY OF THE INVENTION

The invention has been accomplished in consideration of the foregoing points. An object of the invention is to provide a double diaphragm type pressure sensor which can secure the plate thickness of a diaphragm material not lower than a processing limit and minimize the increase of internal pressure caused by the temperature change.

In order to achieve the object of the invention, provided is a double diaphragm type pressure sensor including: a pressure sensor unit mounted on a bottom of a metal container having a concave portion; a metal diaphragm airtightly bonded to an opening portion of the concave portion of the container; a pressure transmission medium filling a space formed by the metal diaphragm and the concave portion of the container; a metal terminal penetrating the bottom of the container and being airtight and electrically insulated from the container.

According to the invention, it is possible to provide a double diaphragm type pressure sensor which can secure the plate thickness of a diaphragm material not lower than a processing limit, and minimize the increase of internal pressure caused by the temperature change.

BRIEF DESCRIPTION OF THE DRAWINGS

FIG. 6 is a sectional view showing the internal pressure and external pressure applied at a room temperature in the conventional double diaphragm type pressure sensor.

DETAILED DESCRIPTION OF THE INVENTION

An embodiment of a double diaphragm type pressure sensor according to the invention will be described below in detail with reference to the drawings. Incidentally, the same constituents in the following description of the embodiment and the accompanying drawings will be referred to by the same numerals respectively and correspondingly and duplicate description thereof will be omitted. In addition, in order to make it easy to see or make it easy to understand, the accompanying drawings used in the following description are drawn not with accurate scales or proportions. In addition, the invention should not be limited to the description of the undermentioned embodiment as long as it does not depart from its spirit and scope.

Figure 1:
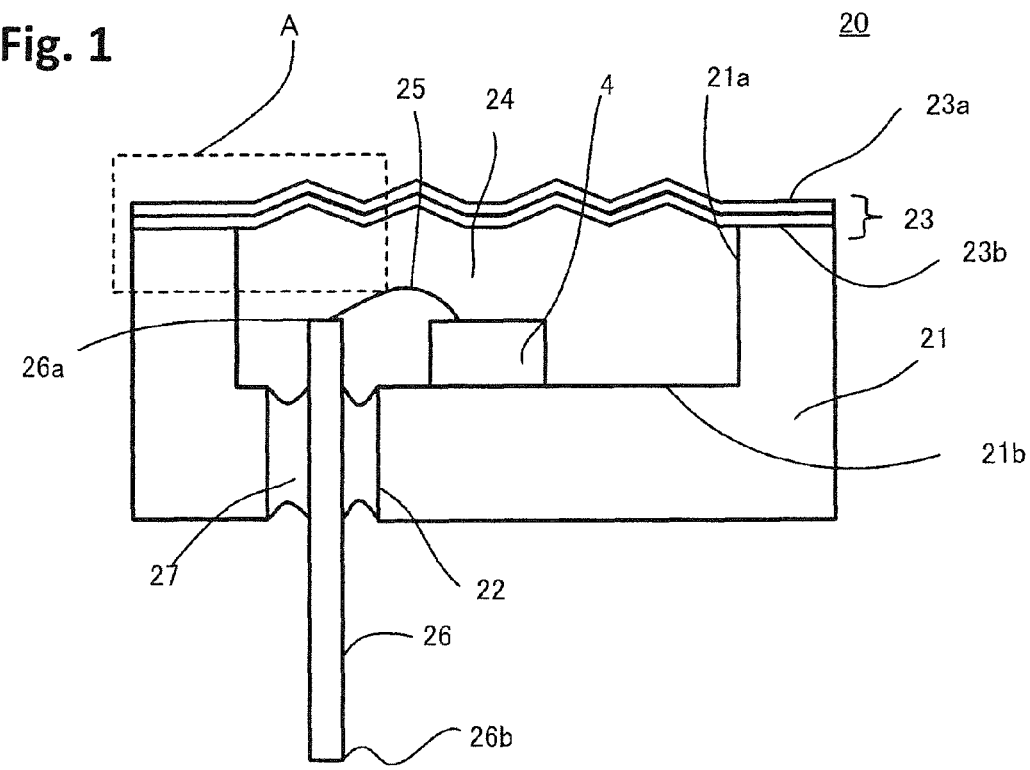
FIG. 1 is a sectional view of a double diaphragm type pressure sensor according to the invention.

A double diaphragm type pressure sensor 20 according to the invention shown in FIG. 1 includes a concave metal container 21 using stainless steel such as SUS 304 (corresponding to UNS: S30400 and AISI:304) as a base material and having an opening portion 21a in one side (upper side). A pressure sensor unit 4 is bonded to the center of an inner bottom 21b of the concave metal container 21. A plurality of through holes 22 is provided in the inner bottom 21b of the concave metal container 21 to be disposed to surround the pressure sensor unit 4. Metal terminals 26 retained by glass 27 or the like to be hermetically sealed and electrically insulated from the metal container 21 are disposed in the through holes 22 respectively. The metal terminals 26 extend from one ends 26a placed inside the metal container 21 to the other ends 26b led outside the container through the through holes 22 hermetically sealed with glass, respectively. A metal diaphragm 23 (23a and 23b) according to the invention, which has a difference in thermal expansion coefficient between its front side and its back side, is welded to the upper edge portion of the opening portion 21a of the concave metal container 21. A space formed by the metal diaphragm 23 and the metal container 21 is an airtight space. The airtight space is filled with silicone oil 24. The silicone oil 24 is injected into the metal container 21 through hollow metal terminal pipes (not shown in the drawing) serving as a part of the plurality of metal terminals 26 provided in the bottom 21b of the metal container 21. The pipes are sealed after the injection. Thus, the airtight space is airtightly filled with the silicone oil 24. Required wiring connection between the other metal terminals 26 and the pressure sensor unit 4 is performed by bonding wires 25 such as gold wires or aluminum wires in order to input/output, from/to the outside, an electric signal obtained by converting detected liquid pressure.

Figure 7:
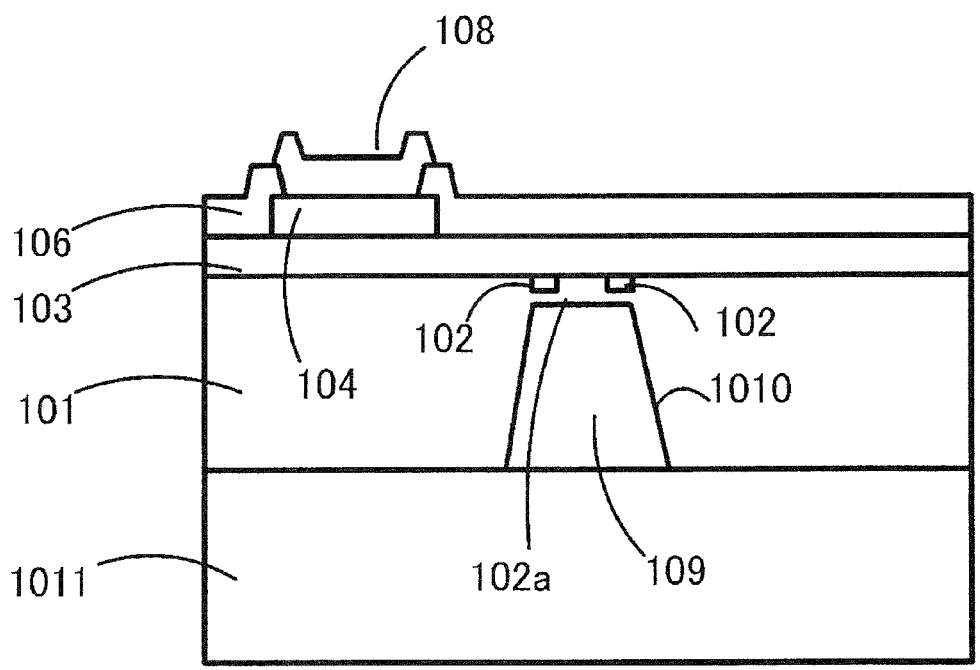
FIG. 7 is a sectional view of a main part of an example of a pressure sensor unit 4 which is applied to the invention.

FIG. 7 is a sectional view of a main part of an example of the pressure sensor unit 4 which uses a strain gauge type semiconductor pressure sensor and which is applied to the invention.

The pressure sensor unit 4 includes a semiconductor pressure sensor chip 101 having a concave portion 1010 serving as a vacuum reference chamber 109, and a glass substrate 1011 electrostatically bonded to the semiconductor pressure sensor chip 101 (back surface) on an opening portion side of the concave portion 1010. When the glass substrate 1011 is fixedly bonded to the semiconductor pressure sensor chip 101, the vacuum reference chamber 109 is formed. The semiconductor pressure sensor chip 101 has a diaphragm 102a, and a strain gauge resistor 102 electrically connected to the diaphragm 102a. The pressure sensor unit 4 further includes an interlayer insulating film serving as a silicon oxide film 103 which is electrically connected to the strain gauge resistor 102 and which is disposed on the semiconductor pressure sensor chip 101, and an aluminum wiring layer 104 made of an Al—Si—Cu film which is disposed on the silicon oxide film 103. The pressure sensor unit 4 further includes a pad electrode 108 and a passivation film 106 which are provided on the aluminum wiring layer 104. The pad electrode 108 is made of a Pt film, an Au film or the like. The passivation film 106 covers the silicon oxide film 103 and the aluminum wiring layer 104.

In addition, a temperature detection portion including a semiconductor temperature sensor, a digital/analog converter, an output signal amplification circuit, etc. may be further included as a semiconductor pressure sensor chip 201 on the same semiconductor pressure sensor chip 101.

The pressure sensor unit 4 may be provided with only the semiconductor pressure sensor chip 101 without the glass substrate 1011. Further, the pressure sensor unit 4 shown in FIG. 7 may be arranged to be disposed inside a resin casing (not shown in the drawing) having a concave portion in which external lead-out terminals and the semiconductor pressure sensor chip 101 can be disposed.

Incidentally, other than the strain gauge type semiconductor pressure sensor, for example, the invention may use an electrostatic capacitance type semiconductor pressure sensor. Further, the invention may use another pressure sensor than the semiconductor pressure sensor.

Figure 2:
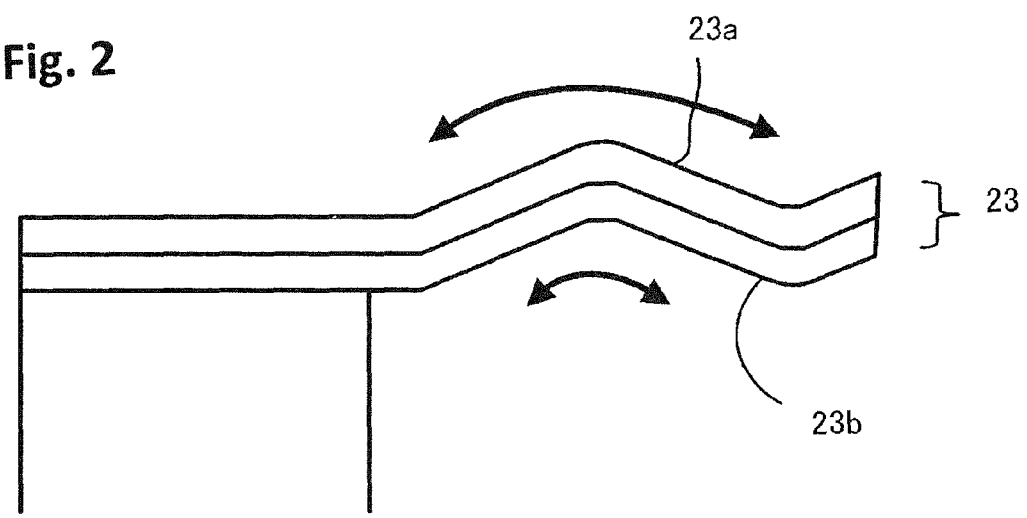
FIG. 2 is an enlarged sectional view of a broken-line frame in FIG. 1 according to the invention.
Figure 3:
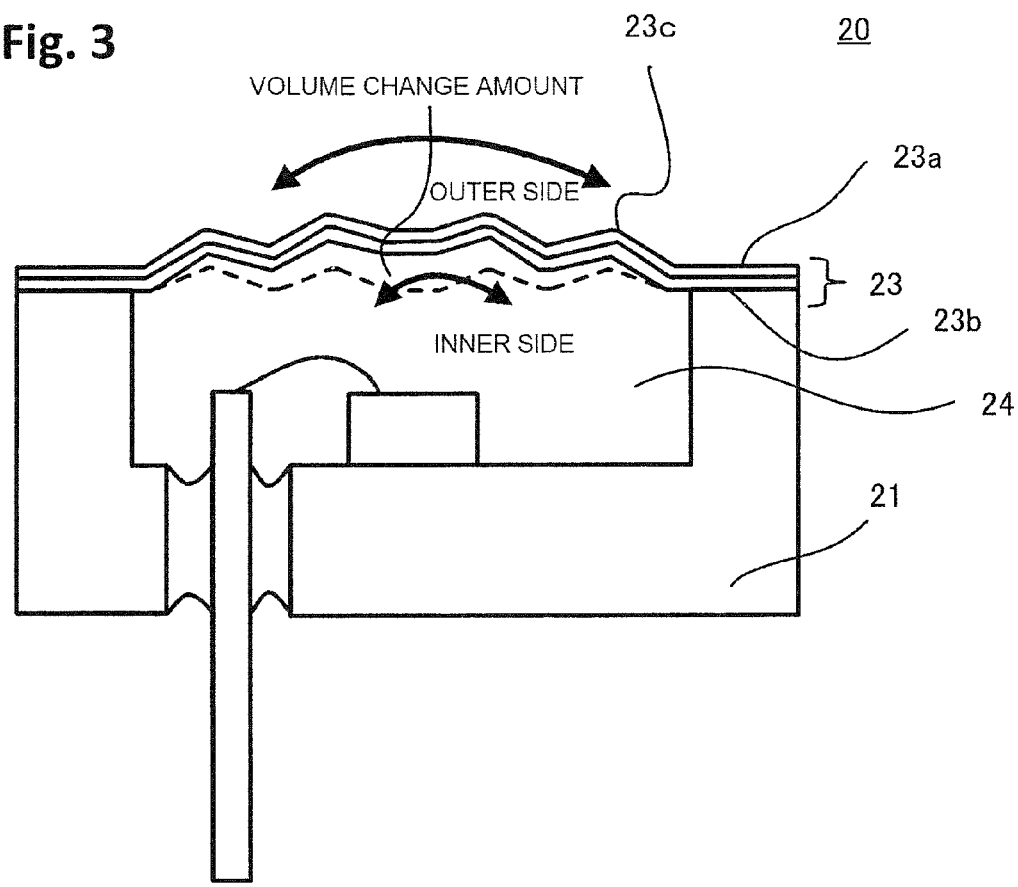
FIG. 3 is a sectional view of the double diaphragm type pressure sensor showing a volume change amount caused by deformation of bimetal at a high temperature and a volume change amount caused by thermal expansion of oil, according to the invention.
Figure 4:
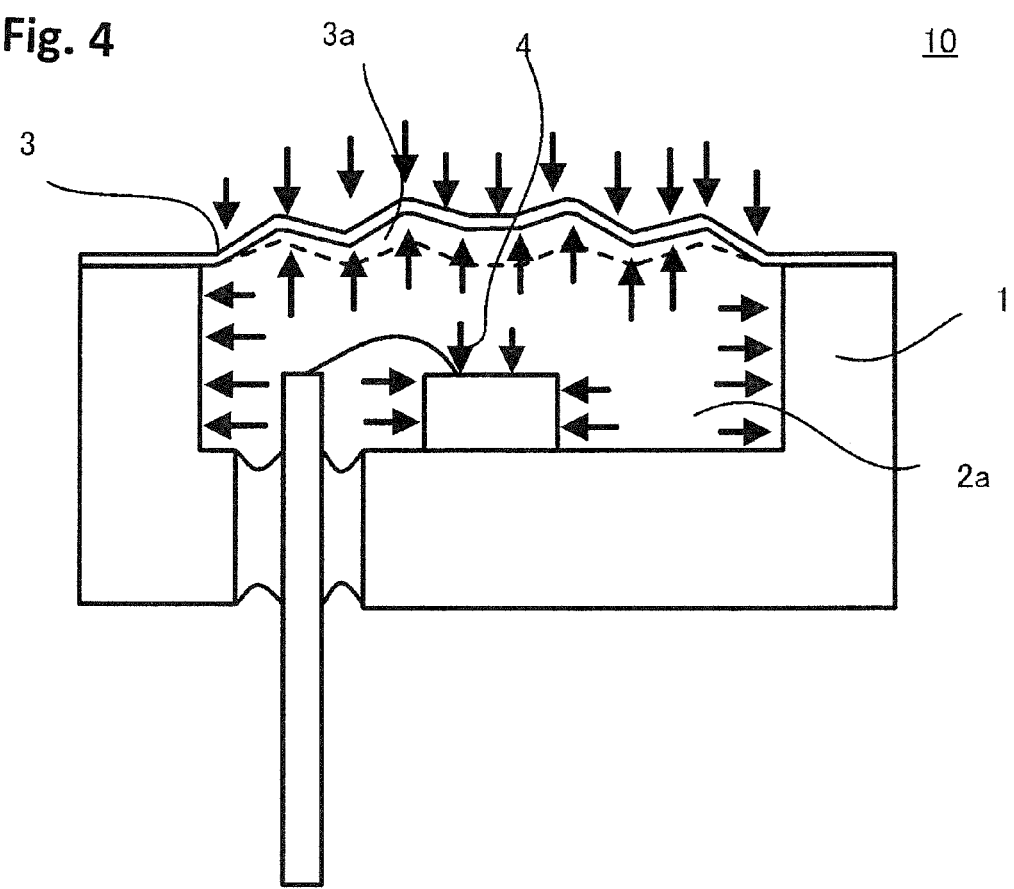
FIG. 4 is a sectional view showing the internal pressure and external pressure applied at a high temperature in a conventional double diaphragm type pressure sensor.
Figure 5A:
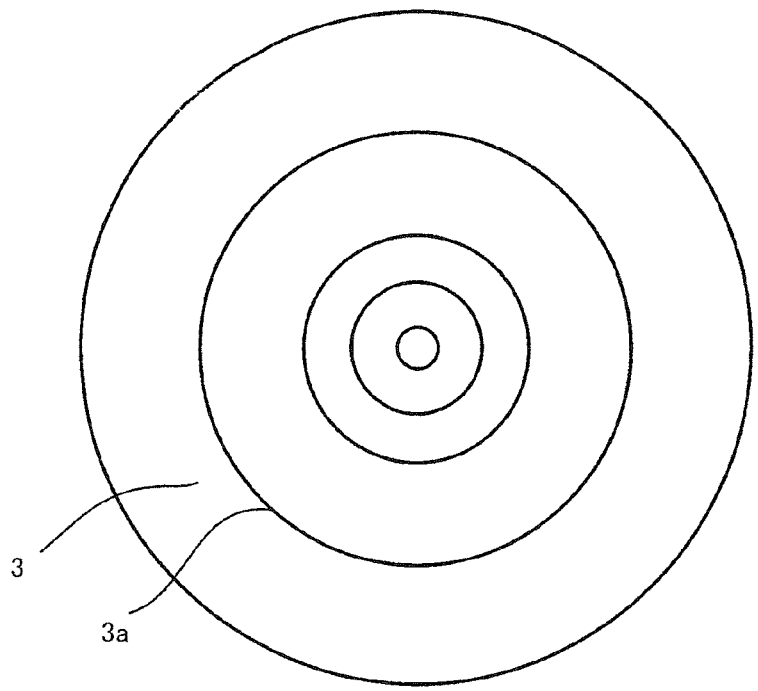
FIG. 5A is a plan view of a metal diaphragm of the conventional double diaphragm type pressure sensor and FIG. 5B is a sectional view taken along line 5B-5B in FIG. 5A.
Figure 5B:
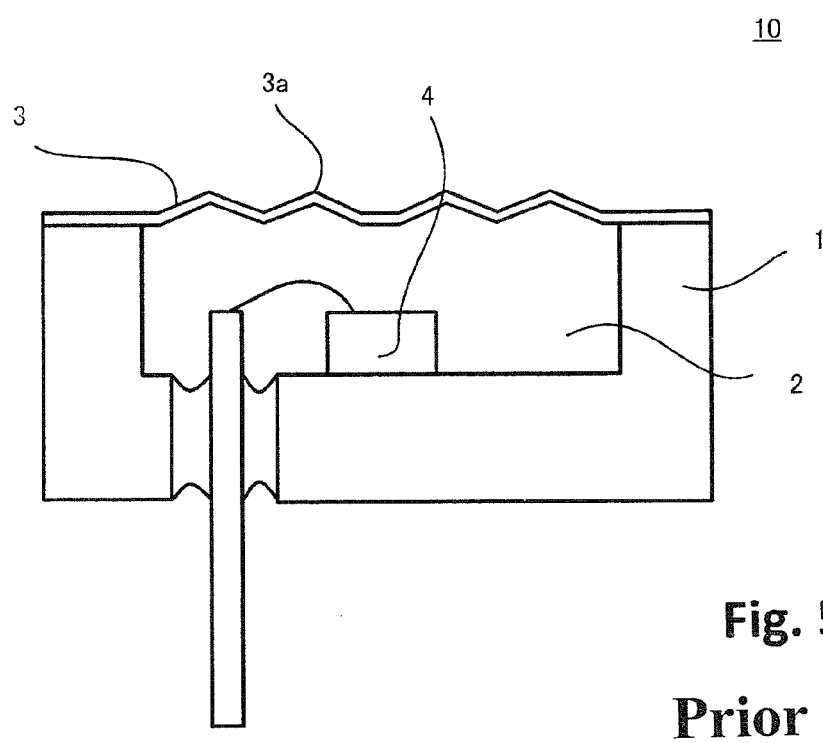

When the metal diaphragm 23 is formed as a laminate of materials of different kind of metals 23a and 23b having different thermal expansion coefficients, the metal diaphragm 23 can have the same function as bimetal. When the metal diaphragm 23 is heated, one metal plate portion 23a having a high thermal expansion coefficient extends largely but the other metal plate portion 23b having a low thermal expansion coefficient does not extend much, as indicated by arrows in FIG. 2 which is an enlarged sectional view of a broken-line frame A in FIG. 1. As a result, when the metal plate portion 23a having a high thermal expansion coefficient is located in the outside, the metal diaphragm 23 is deformed to bulge outward with respect to a position indicated by a broken line as shown in FIG. 3 and the internal space is deformed into a convex shape to bulge upward as illustrated. On the contrary, when the metal diaphragm 23 is cooled, it exhibits a behavior opposite to that when the metal diaphragm 23 is heated. The metal diaphragm 23 is deformed to dent inward and the internal space is deformed into a concave shape. By utilizing the difference between the concave shape and the convex shape, the change of internal pressure caused by volume expansion/contraction of the silicone oil 24 according to temperature can be absorbed by thermal deformation of the metal diaphragm 23. The silicone oil 24 is a pressure transmission medium tightly sealed internally.

Thus, when the temperature of an external atmosphere or the temperature of a liquid to be measured is high, the temperature of the double diaphragm type pressure sensor 20 according to the invention increases. In this case, the silicone oil 24 serving as a pressure transmission medium thermally expands to generate positive pressure (internal pressure) inside the metal container 21 constituting the pressure sensor 20 as shown in FIG. 3. However, at the same time, stress occurs in the metal diaphragm 23 per se including the inner side material 23b having a low thermal expansion coefficient and the outer side material 23a having a high thermal expansion coefficient so that the metal diaphragm 23 can bulge outward to thereby increase the volume of the airtight space inside the metal container 21 due to the increase of the temperature. As a result, a negative pressure occurs inside the metal container 21. Consequently, an occurrence of internal pressure can be cancelled when the increased amount of the positive pressure in the direction to increase the volume due to the internal pressure is made equal to the decreased amount of the negative pressure caused by the increase of the volume due to deformation of the metal diaphragm. This can result in contribution to improvement of temperature characteristics of the pressure sensor.

Further, in order to relax the increase of the internal pressure of the silicone oil 24 by means of the metal diaphragm, it is also preferable that a concentric circular corrugated shape 23c is formed in the metal diaphragm 23.

In order to form such a metal diaphragm 23, a 15 μm-thick plate material 23a of SUS 316L (corresponding to UNS: S31603 and AISI: 316L) stainless steel whose thermal expansion coefficient is $15.9 \times 10^{-6}$ (20° C.) is used as the front side (outer side) material having a diameter of 10 mm. A 15 μm-thick plate material 23b of Fe/Ni42 (42 alloy) whose thermal expansion coefficient is $4.3 \times 10^{-6}$ (20° C.) is used as the inner side material. The stainless steel plate material 23a and the Fe/Ni42 plate material 23b are laminated to each other to form a corrugated shape which has quadruple concentric circles arranged in equal intervals and a wave amplitude height of 50 μm. This metal diaphragm 23 is welded to the upper edge portion of the opening portion 21a of the metal container 21, as shown in FIG. 1. In the metal container 21, the silicon pressure sensor unit 4 is bonded to the bottom 21b of the concave portion. The metal terminals 26 are fixed to the through holes 22 provided in the bottom 21b of the concave portion through the hermetic sealing with glass. Required aluminum wires 25 are connected between the silicon pressure sensor unit 4 and the upper end portions 26b of the metal terminals 26 insulated from the metal container 21. The aforementioned thickness of the metal diaphragm can be selected from the range of 15 μm to 40 μm.

After the metal diaphragm 23 is welded to the upper edge portion of the opening portion 21a of the metal container 21 as described above, the silicone oil 24 whose thermal expansion coefficient is $317 \times 10^{-6}$ (20°) is injected into the concave portion of the metal container 21 through pipe-like metal terminals (not shown) of the metal terminals 26 so that the internal space of the metal container 21 can be filled with the silicone oil 24. Then, the pipes of the portions led to the outside of the metal container 21 are squashed to tightly seal the silicone oil 24 inside the metal container 21. Thus, the double diaphragm type pressure sensor according to the invention can be obtained.

According to the double diaphragm type pressure sensor, it is possible to secure the plate thickness of the diaphragm material not lower than a processing limit. In addition, it is possible to suppress the increase of internal pressure caused by temperature change to the minimum to thereby reduce an adverse effect on temperature characteristics during pressure measurement.

What is claimed is:

1. A double diaphragm pressure sensor comprising:
   a metal container having a concave portion with an opening portion;
   a pressure sensor unit mounted on a bottom of the container;
   a metal diaphragm airtightly bonded to the opening portion of the concave portion of the container;
   a pressure transmission medium filling a space formed by the metal diaphragm and the concave portion of the container; and
   a metal terminal penetrating the bottom of the container and being electrically insulated from the container,
   wherein the metal diaphragm is formed from a lamination of an outer side diaphragm part having a high thermal expansion coefficient and an inner side diaphragm part having a low thermal expansion coefficient than that of the outer side diaphragm so that change of internal pressure caused by volume expansion/contraction of the pressure transmission medium according to temperature is absorbed by thermal deformation of the metal diaphragm.

2. A double diaphragm pressure sensor according to claim 1, wherein the diaphragm has a thickness in a range of 15 μm to 40 μm;
   the outer side diaphragm part having the high thermal expansion coefficient is formed from SUS 316L stainless steel; and
   the inner side diaphragm part having the low thermal expansion coefficient is formed from Fe/Ni42.

3. A double diaphragm pressure sensor according to claim 2, wherein the metal diaphragm is circular and has a concentric circular corrugated shape.

4. A double diaphragm pressure sensor according to claim 3, wherein the concentric circular corrugated shape is a corrugated shape having triple to quintuple concentric circles arranged in equal intervals and having a wave amplitude height of 30 μm to 50 μm.

5. A double diaphragm pressure sensor according to claim 1, wherein the pressure transmission medium is silicone oil.

6. A double diaphragm pressure sensor according to claim 1, wherein the container is made of stainless steel.

7. A double diaphragm pressure sensor according to claim 1, wherein the pressure sensor unit includes a semiconductor pressure sensor chip.

8. A double diaphragm pressure sensor according to claim 1, wherein the pressure sensor unit is a semiconductor pressure sensor chip.

9. A double diaphragm pressure sensor according to claim 1, wherein the metal diaphragm is arranged such that when the metal diaphragm is heated, the outside diaphragm extends largely to bulge outward and an internal space is deformed into a convex shape to bulge upward, and when the metal diaphragm is cooled, the metal diaphragm is deformed to dent inward and the internal space is deformed into a concave shape.

* * * * *